W. Webb.
Chuck.

No. 88,245. Patented Mar. 23, 1869.

Witnesses,
M. Bailey
Wm H McCabe

Inventor:
Wm Webb.
by A Pollok
his atty

UNITED STATES PATENT OFFICE.

WILLIAM WEBB, OF WATERBURY, CONNECTICUT.

*Letters Patent No. 88,245, dated March 23, 1869.*

---

IMPROVED EXPANDING-CHUCK.

---

The Schedule referred to in these Letters Patent and making part of the same.

---

*To whom it may concern:*

Be it known that I, WILLIAM WEBB, of Waterbury, in the county of New Haven, and State of Connecticut, have invented certain new and useful Improvements in Chucks for Lathes; and I hereby declare the following to be a full, clear, and exact description of the same, reference being had to the accompanying drawings, in which—

Figure 1:
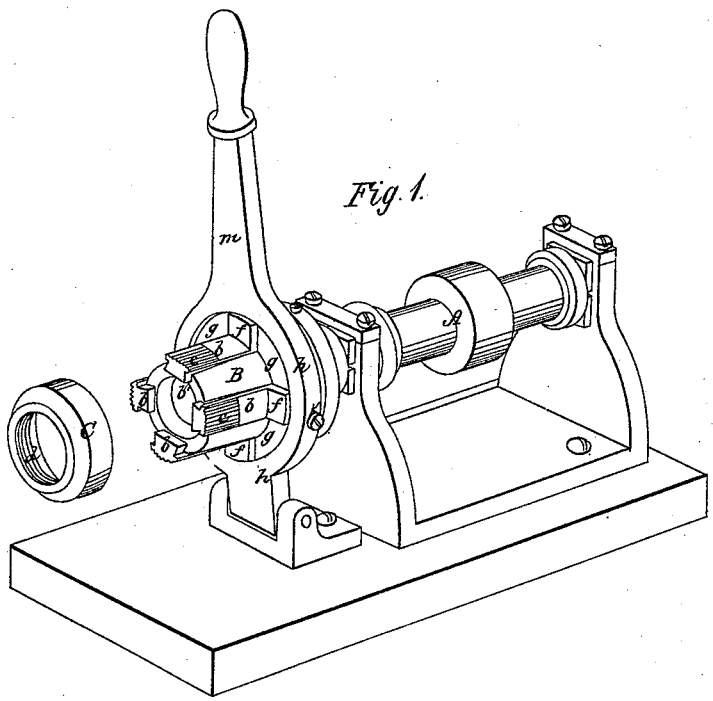
Figure 2:
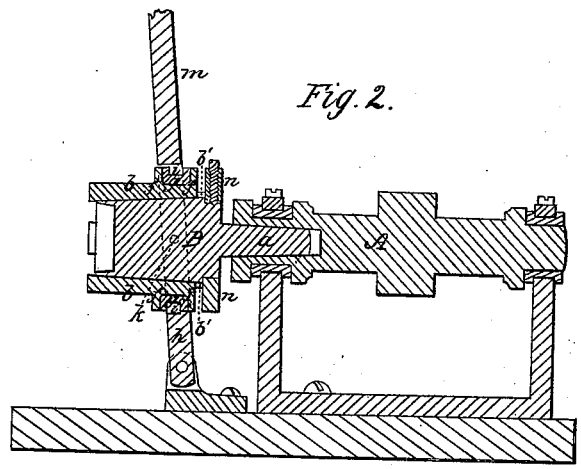

Figure 1 is a perspective view of a chuck made in accordance with my invention, and Figure 2 is a longitudinal vertical central section of the same.

This invention relates to chucks for holding hollow articles, such as lamp-collars, &c., which are placed over or upon the chuck.

The device, in the form illustrated in the drawings, is specially designed for holding lamp-collars while the screw-thread is being cut; and while the invention is applicable to many other purposes, its principle will be readily understood if explained with reference to the chuck referred to.

The method heretofore in use for holding the collar, or other article, has been simply to drive it on a solid chuck, having a roughened, or file-like surface. The inconveniences attending that method will be at once recognized, for not only must the motion of the chuck be arrested when removing or putting on the collar, but the chuck soon becomes damaged and worn out, the collar is swaged, or spread out, and the chuck will not fit articles often varying in size.

The object I have in view is to remedy these and other defects, so that the collar may be applied or removed easily and quickly while the chuck is in full motion, and may at the same time be held firmly in position when on the chuck, the latter being also adapted to conform to variations in size of the collars, or other articles which are successively applied to it.

To enable others to make and use my invention, I will proceed to describe, in detail, the manner in which the same is or may be carried into effect, by reference to the drawings.

The pulley, or driving-shaft of the chuck, is shown at A, supported in suitable bearings. To the front end of this the chuck is secured, in any convenient manner, in this instance by means of a spindle, $a$, forming part of the body of the chuck, which is driven or wedged in a recess tapped out in the end of the shaft.

In order to adapt the chuck B to the objects for which it is designed, it is provided upon its exterior with slides $b$, the under sides of which are bevelled, or inclined from front to rear, and these slides are held and moved in dovetailed longitudinal grooves $b^1$, of a like bevelled form, cut in the body of the chuck.

One or more of these slides may be used, as desired. In this instance, as the object to be held, the collar C, is cylindrical, I employ four.

Owing to the bevelled form of the slides and grooves, it will be seen that when the slides are moved backward, the chuck will expand, and when moved forward, the chuck will contract, so that when the slides are in the former position, the collar C can be readily placed over them, and then can be firmly and securely held by drawing backward the slides, which will thus be forced outward tightly against the interior surface of the collar, and the roughened surface $c$ of the slides will effectually hold the collar in position while the screw-thread $d$, is being cut during the revolution of the chuck.

In order to effect simultaneous adjustment of all the slides, without interfering with the rotary movement of the chuck, I provide each slide, at its rear end, with a jaw, $f$, which stands at about right angles to the plane of movement of the slides.

The slides are arranged, as shown in fig. 2, so that their jaws will fit within, and grasp a grooved annulus, $g$, which encircles both the slides and the body of the chuck, so that by moving the annulus forward or backward, the slides will have a corresponding movement, and the chuck will accordingly be contracted or expanded.

In order that the annulus may be thus actuated, whenever desired, it has formed in its periphery a continuous groove, $i$, and is surrounded by a ring, or other suitably-shaped frame, $h$, provided with set-screws K, which project into the groove $i$.

The frame is hinged at its lower end to the base-piece, and carries on top a handle, $m$, by which it is operated, or moved.

The screws, or pins K, do not interfere in the least with the rotary movement of the chuck, while, at the same time, when the frame $h$ is swung forward or backward on its hinge, by means of the handle, they will communicate a like movement, through the medium of the annulus, to the slides, and the chuck can thus be expanded or contracted, at pleasure, without checking its rotary movement.

If it be supposed that the chuck is in revolution, and the slides are in their forward and contracted position, the collar C, to be operated on, is placed over the head of the chuck. The handle $m$ is then moved back, drawing with it the slides, and the chuck, thus expanded, will hold the collar most firmly, at the same time that it adapts itself to the size of the same.

After the screw-thread is cut, the handle $m$ is brought forward, inducing a corresponding movement of the slides, and from the now contracted chuck, which still continues in full motion, the collar can be removed with the utmost facility.

A washer, $n$, secured to the body of the chuck, in rear of the slides, prevents the latter from being moved back too far; and in order to interfere as little as possible with the revolution of the chuck, the ends of the pins, or screws K, may be received in small washers lying in the groove $i$, and shaped to conform to the curve of the same.

The construction of the frame $h$, for adjusting the position of the slides, may obviously be varied in many respects, without departing from the principle of the invention, and instead of being hinged and vibrating, it may be arranged to reciprocate, or move bodily in either direction, being actuated by means of a rack, or pinion, or other known or suitable devices. The effect, however, will in all cases be the same, viz, the reciprocation or vibration of the frame, and the consequent rectilinear movement or adjustment of the slides without interference with the rotation of the chuck.

Having now described my invention, and the manner in which the same is or may be carried into effect,

What I claim, and desire to secure by Letters Patent, is—

1. The combination, with the rotary expanding-chuck, consisting of one or more expanding-slides, mounted in or upon the chuck-body, or stock, as set forth, of the vibratory or reciprocatory frame, arranged to move said slides back and forth upon the chuck, without interfering with its rotation, substantially as and for the purposes described.

2. The construction and arrangement of the vibratory adjusting-lever, or frame, in relation to the chuck-stock, or body, and slides mounted in or upon the said chuck-body, as and for the purposes specified.

In testimony whereof, I have signed my name to this specification, before two subscribing witnesses.

WILLIAM WEBB.

Witnesses:
F. J. KINGSBURY,
M. L. SPERRY.